United States Patent
Yamanaka et al.

(10) Patent No.: US 10,047,175 B2
(45) Date of Patent: Aug. 14, 2018

(54) AQUEOUS DISPERSION OF LOW MOLECULAR WEIGHT POLYTETRAFLUOROETHYLENE, LOW MOLECULAR WEIGHT POLYTETRAFLUOROETHYLENE POWDER, AND METHOD FOR PRODUCING LOW MOLECULAR WEIGHT POLYTETRAFLUOROETHYLENE

(71) Applicant: DAIKIN INDUSTRIES, LTD., Osaka-shi, Osaka (JP)

(72) Inventors: Taku Yamanaka, Settsu (JP); Nobuhiko Tsuda, Settsu (JP); Masayuki Tsuji, Settsu (JP); Yasuhiko Sawada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/645,775

(22) Filed: Mar. 12, 2015

(65) Prior Publication Data
US 2015/0183898 A1 Jul. 2, 2015

Related U.S. Application Data

(62) Division of application No. 12/670,995, filed as application No. PCT/JP2008/064240 on Aug. 7, 2008, now abandoned.

(30) Foreign Application Priority Data

Aug. 7, 2007 (JP) .................................. 2007-205577
Nov. 9, 2007 (JP) .................................. 2007-291981

(51) Int. Cl.
| | |
|---|---|
| *C08F 14/26* | (2006.01) |
| *C08F 214/26* | (2006.01) |
| *C08F 6/22* | (2006.01) |
| *C08F 2/18* | (2006.01) |
| *C08F 6/16* | (2006.01) |
| *G03G 9/097* | (2006.01) |
| *C08F 6/20* | (2006.01) |
| *G03G 9/087* | (2006.01) |

(52) U.S. Cl.
CPC ................. *C08F 14/26* (2013.01); *C08F 2/18* (2013.01); *C08F 6/16* (2013.01); *C08F 6/20* (2013.01); *C08F 6/22* (2013.01); *C08F 214/26* (2013.01); *G03G 9/0872* (2013.01); *G03G 9/09766* (2013.01)

(58) Field of Classification Search
None
See application file for complete search history.

(56) References Cited

U.S. PATENT DOCUMENTS

| | | | |
|---|---|---|---|
| 2,597,702 A | 5/1952 | Benning | |
| 3,956,000 A | 5/1976 | Kuhls et al. | |
| 4,025,481 A | 5/1977 | Tournut et al. | |
| 4,472,290 A | 9/1984 | Caporiccio et al. | |
| 5,473,030 A | 12/1995 | Arcella et al. | |
| 5,641,571 A | 6/1997 | Mayer et al. | |
| 5,789,504 A | 8/1998 | Ihara et al. | |
| 5,804,650 A | 9/1998 | Tsuda et al. | |
| 6,025,307 A | 2/2000 | Chittofrati et al. | |
| 6,653,393 B2 | 11/2003 | Ishii et al. | |
| 6,825,250 B2 | 11/2004 | Epsch et al. | |
| 7,176,265 B2 | 2/2007 | Morgan | |
| 7,696,268 B2 | 4/2010 | Tsuda et al. | |
| 7,968,625 B2 | 6/2011 | Sawauchi et al. | |
| 8,299,155 B2 | 10/2012 | Sawauchi et al. | |
| 9,096,701 B2 * | 8/2015 | Tsuda ...................... C08F 14/26 |
| 2006/0252898 A1 | 11/2006 | Tsuji et al. | |
| 2007/0015857 A1 | 1/2007 | Hoshikawa et al. | |

FOREIGN PATENT DOCUMENTS

| | | | | |
|---|---|---|---|---|
| CN | 1156468 A | 8/1997 | | |
| JP | 51-41085 | 4/1976 | | |
| JP | 05-194972 A | 8/1993 | | |
| JP | 07-196735 A | 8/1995 | | |
| JP | 10-017785 A | 1/1998 | | |
| JP | 10-147617 A | 6/1998 | | |
| JP | 2002-097230 A | 4/2002 | | |
| JP | 2006-063140 A | 3/2006 | | |
| JP | 2007-140076 A | 6/2007 | | |
| WO | WO 2005037880 A1 * | 4/2005 | ............. C08F 14/26 |
| WO | 2007/026822 A1 | 3/2007 | | |

OTHER PUBLICATIONS

International Search Report for PCT/JP2008/064240 dated Oct. 28, 2010.

* cited by examiner

*Primary Examiner* — Nicole M Buie-Hatcher
(74) *Attorney, Agent, or Firm* — Sughrue Mion, PLLC

(57) ABSTRACT

The present invention provides an aqueous dispersion of a low-molecular-weight polytetrafluoroethylene (PTFE), which contains an easily removable surfactant, and has a good dispersion stability. Specifically, the present invention provides an aqueous dispersion of a low-molecular-weight PTFE comprising tetrafluoroethylene (TFE) units, or TFE units and modifying monomer units which are copolymerizable with the TFE units, wherein the aqueous dispersion contains from 70 to 9,000 ppm, based on the aqueous dispersion, of a fluorine-containing compound of the formula (1) below:

$$X-(CF_2)_m-Y \qquad (1)$$

where X is H or F; m is an integer from 3 to 5; and Y is $-SO_3M$, $-SO_4M$, $-SO_3R$, $-SO_4R$, $-COOM$, $-PO_3M_2$ or $-PO_4M_2$, M being H, $NH_4$ or an alkali metal, and R being an alkyl group having 1 to 12 carbons, and the low-molecular-weight PTFE has an average primary particle size of from 100 to 350 nm.

6 Claims, No Drawings

AQUEOUS DISPERSION OF LOW MOLECULAR WEIGHT POLYTETRAFLUOROETHYLENE, LOW MOLECULAR WEIGHT POLYTETRAFLUOROETHYLENE POWDER, AND METHOD FOR PRODUCING LOW MOLECULAR WEIGHT POLYTETRAFLUOROETHYLENE

CROSS REFERENCE TO RELATED APPLICATIONS

This is a Divisional of U.S. application Ser. No. 12/670,995 filed Jan. 27, 2010, which is a National Stage Entry of PCT International Application No. PCT/JP2008/064240 filed Aug. 7, 2008, which claims benefit of Japanese Patent Application No. 2007-205577 filed Aug. 7, 2007 and Japanese Patent Application No. 2007-291981 filed Nov. 9, 2007. The above-noted applications are incorporated herein by reference in their entirety.

TECHNICAL FIELD

The present invention relates to an aqueous dispersion of a low-molecular-weight polytetrafluoroethylene, a low-molecular-weight polytetrafluoroethylene powder, and a method of producing a low-molecular-weight polytetrafluoroethylene.

BACKGROUND ART

Low-molecular-weight polytetrafluoroethylenes (PTFE) with a molecular weight of 600,000 or less, because they have an excellent chemical stability, a very low surface energy and do not readily fibrillate, are used as additives in the manufacture of plastics, inks, cosmetics, paints, greases and the like to enhance lubricity and the coat-surface texture.

Patent Document 1 describes the production of low-molecular-weight tetrafluoroethylene waxes using an ammonium salt or alkali metal (e.g., sodium, potassium) salt of a perfluoro- or ω-hydroperfluoroalkylcarboxylic acid as an emulsifier.

Patent Document 2 describes the production of a low-molecular-weight PTFE using a water-soluble fluorine-containing dispersant of the formula:

$$X(CF_2)_a COOH$$

(wherein X is hydrogen atom, fluorine atom or chlorine atom; and a is an integer from 6 to 12).

Patent Document 1: Japanese Kokai Publication S51-41085
Patent Document 2: Japanese Kokai Publication H10-147617

DISCLOSURE OF INVENTION

Problems which the Invention is to Solve

However, there is no mention in Patent Documents 1 and 2 of the use of a compound having 6 or fewer carbons. Because surfactants having 7 or more carbons have a low solubility in water, a cost required for their removal is high.

A surfactant used in emulsion polymerization for producing a low-molecular-weight PTFE is preferably a surfactant having a small number of carbons because such a surfactant is easy to remove from the resulting polymer. However, the surfactant having a small number of carbons lacks a sufficient surface activity.

In view of the current state of the art described above, one object of the present invention is to provide an aqueous dispersion of a low-molecular-weight polytetrafluoroethylene, which contains a surfactant having a small number of carbons and has a good dispersion stability.

Another object of the invention is to provide a low-molecular-weight polytetrafluoroethylene powder, which has an extremely low surfactant content.

A further object of the invention is to provide a method of producing a low-molecular-weight polytetrafluoroethylene using a surfactant having a small number of carbons.

Means for Solving the Problems

The present invention provides an aqueous dispersion of a low-molecular-weight polytetrafluoroethylene (PTFE) comprising tetrafluoroethylene (TFE) units, or TFE units and modifying monomer units copolymerizable with the TFE units, wherein the aqueous dispersion contains from 70 to 9,000 ppm, based on the aqueous dispersion, of a fluorine-containing compound of the formula (1) below:

$$X—(CF_2)_m—Y \qquad (1)$$

where X is H or F; m is an integer from 3 to 5; and Y is $—SO_3M$, $—SO_4M$, $—SO_3R$, $—SO_4R$, $—COOM$, $—PO_3M_2$ or $—PO_4M_2$, M being H, $NH_4$ or an alkali metal, and R being an alkyl group having 1 to 12 carbons, and the low-molecular-weight PTFE has an average primary particle size of from 100 to 350 nm.

The present invention also provides a low-molecular-weight PTFE powder comprising TFE units, or TFE units and modifying monomer units copolymerizable with the TFE units, wherein the low-molecular-weight polytetrafluoroethylene powder contains not more than 100 ppm, based on the powder, of a fluorine-containing compound of the formula (1) below:

$$X—(CF_2)_m—Y \qquad (1)$$

where X is H or F; m is an integer from 3 to 5; and Y is $—SO_3M$, $—SO_4M$, $—SO_3R$, $—SO_4R$, $—COOM$, $—PO_3M_2$ or $—PO_4M_2$, M being H. $NH_4$ or an alkali metal, and R being an alkyl group having 1 to 12 carbons, and is free from a fluorine-containing compound of the formula (3) below:

$$X—(CF_2)_m—Y \qquad (3)$$

where X is H or F; m is an integer of 6 or more; and Y is $—SO_3M$, $—SO_4M$, $—SO_3R$, $—SO_4R$, $—COOM$, $—PO_3M_2$ or $—PO_4M_2$, M being H, $NH_4$ or an alkali metal, and R being an alkyl group having 1 to 12 carbons.

The present invention further provides a method of producing a low-molecular-weight PTFE, comprising: emulsion-polymerizing, in an aqueous medium, TFE, or TFE and a modifying monomer copolymerizable with the TFE in the presence of a chain transfer agent, wherein the emulsion polymerization is carried out in the presence of a fluorine-containing compound of the formula (1) below:

$$X—(CF_2)_m Y \qquad (1)$$

where X is H or F; m is an integer from 3 to 5; and Y is $—SO_3M$, $—SO_4M$, $—SO_3R$, $—SO_4R$, $—COOM$, $—PO_3M_2$ or $—PO_4M_2$, M being H, $NH_4$ or an alkali metal, and R being an alkyl group having 1 to 12 carbons.

The present invention thus provides an aqueous dispersion of a low-molecular-weight PTFE, which is obtainable by the foregoing production method.

The present invention also provides a low-molecular-weight PTFE, which is obtained by the foregoing production method.

The present invention further provides a coating, engineering plastic, cosmetic, grease or toner, which includes the above aqueous dispersion of a low-molecular-weight PTFE, the above low-molecular-weight PTFE powder or the above low-molecular-weight PTFE.

The invention is described more fully below.

The aqueous dispersion of a low-molecular-weight polytetrafluoroethylene (PTFE) of the invention is an aqueous dispersion of a low-molecular-weight PTFE containing tetrafluoroethylene (TFE) units, or TFE units and modifying monomer units copolymerizable with the TFE units, and includes from 70 to 9,000 ppm, based on the aqueous dispersion, of a fluorine-containing compound of the subsequently described formula (1), and the low-molecular-weight PTFE of which has an average primary particle size of from 100 to 350 nm.

The aqueous dispersion of a low-molecular-weight PTFE according to the present invention has a fluorine-containing compound content, based on the aqueous dispersion, of from 70 to 9000 ppm, and thus has a good dispersion stability. In addition, because the above fluorine-containing compound is a compound of the subsequently described formula (1), its removal is easy. Even in cases where the aqueous dispersion of a low-molecular-weight PTFE according to the present invention is used as an additive, there is no adverse influence from the residual presence of this compound.

The fluorine-containing compound content of the aqueous dispersion is preferably not less than 350 ppm, and preferably not more than 1,800 ppm.

The aqueous dispersion of a low-molecular-weight PTFE of the invention is free from a fluorine-containing compound of the formula (3) below:

X—(CF$_2$)$_m$—Y            (3)

(wherein X is H or F, m is an integer of 6 or more, and Y is —SO$_3$M, —SO$_4$M, —SO$_3$R, —SO$_4$R, —COOM, —PO$_3$M$_2$ or —PO$_4$M$_2$ (M is H, NH$_4$ or an alkali metal; and R is an alkyl group having 1 to 12 carbons)).

In the present description, the fluorine-containing compound content of the aqueous dispersion is a value obtained in the following manner.

HPLC is carried out on aqueous solutions of the fluorine-containing compound having concentrations of 0.5 ppm, 1.0 ppm, 5 ppm, 10 ppm, 50 ppm, 100 ppm and 500 ppm under the following conditions: column, ODS 120A (Tosoh Corporation); developing solution, acetonitrile/0.05 M aqueous phosphoric acid=60/40 (vol/vol %); flow rate, 1.0 mL/min; sample volume, 20 μL; column temperature, 40° C.; detection light, UV 210 nm. A working curve is then constructed from the fluorine-containing compound concentration versus the peak area of the fluorine-containing compound.

Methanol is added in the same volume of the aqueous dispersion to be measured and uniform mixing is carried out, after which the mixture is left at rest and the amount of the fluorine-containing compound present in the supernatant portion of the dispersion is measured under the above HPLC conditions. The fluorine-containing compound content of the aqueous dispersion is determined, based on the working work, from the resulting fluorine-containing compound peak area.

In the aqueous dispersion of a low-molecular-weight PTFE according to the present invention, an average primary particle size of the low-molecular-weight PTFE is from 100 to 350 nm. When an aqueous dispersion of a low-molecular-weight PTFE having such a small average primary particle size is used as an additive, a coat-surface texture can be improved. Also, because oil absorption capacity is high as well, micro dispersion of the aqueous dispersion in a matrix material is easy.

The low-molecular-weight PTFE has an average primary particle size of preferably 300 nm or less.

The above average primary particle size is obtained as follows. A working curve of a transmittance of 550 nm incident light through a unit length of an aqueous dispersion adjusted to a low-molecular-weight PTFE concentration of 0.22% by mass versus an average primary particle size determined by measuring the particle diameter in a certain specific direction on a transmission electron micrograph is constructed. The above transmittance through a sample aqueous dispersion is then measured, and the average primary particle size is determined based on the working curve.

The aqueous dispersion of a low-molecular-weight PTFE may be advantageously prepared by the subsequently described method of producing a low-molecular-weight PTFE.

The low-molecular-weight PTFE powder of the invention is a low-molecular-weight PTFE powder containing TFE units, or TFE units and modifying monomer units which are copolymerizable with the TFE units, and contains not more than 100 ppm, based on the low-molecular-weight polytetrafluoroethylene powder, of the fluorine-containing compound of the subsequently described formula (1).

The low-molecular-weight PTFE powder of the invention has a fluorine-containing compound content of not more than 100 ppm. The fluorine-containing compound content is preferably not more than 5 ppm. Moreover, in the above low-molecular-weight PTFE powder, by further enhancing the removal efficiency in washing and drying steps, the fluorine-containing compound content of the low-molecular-weight PTFE powder can easily be lower to 1 ppm or less. Because this content is very low compared with a conventional powder, the powder according to the present invention may be used directly as an additive without taking into account a surfactant content as in the conventional art. For such reasons, it is preferable that the low-molecular-weight PTFE powder of the invention include as little fluorine-containing compound as possible.

The low-molecular-weight PTFE powder of the invention is free from a fluorine-containing compound of the formula (3) below:

X—(CF$_2$)$_m$—Y            (3)

where X is H or F; m is an integer of 6 or more; and Y is —SO$_3$M, —SO$_4$M, —SO$_3$R, —SO$_4$R, —COOM, —PO$_3$M$_2$ or —PO$_4$M$_2$, (M is H, NH$_4$ or an alkali metal, and R is an alkyl group having 1 to 12 carbons).

In this description, the fluorine-containing compound content of the powder is a value obtained by the following measurement method.

Thirty milliliters of methanol is added as an extracting solvent to 3 g of the powder, and extraction is carried out at 150° C. for 60 minutes using Microwave Assisted Solvent Extraction MARS 5 (CEM Corporation). An extracted methanol solution following extraction is measured using a Quattro micro API (Waters Corporation) under the following conditions: column, Atlantis dC18 (Waters Corporation); developing solution, acetonitrile/0.15% aqueous acetic acid=45/55 (vol/vol %); flow rate, 0.15 mL/min; sample volume, 5 μL; column temperature, 40° C. A concentration of the fluorine-containing compound in the powder is determined, based on a working curve, from a peak area of the resulting fluorine-containing compound.

The above working curve is obtained by measuring methanol solutions of the fluorine-containing compound at known concentrations under the above conditions, and creating a curve of the fluorine-containing compound concentration versus a fluorine-containing compound peak area.

The low-molecular-weight PTFE powder can be advantageously produced by coagulating and drying the above aqueous dispersion of a low-molecular-weight PTFE.

The method of producing the low-molecular-weight PTFE according to the present invention is a method of producing a low-molecular-weight polytetrafluoroethylene (PTFE) by carrying out emulsion polymerization in the presence of the fluorine-containing compound of the formula (1) below:

$$X-(CF_2)_m-Y \tag{1}$$

(where X is H or F, m is an integer from 3 to 5; and Y is —SO$_3$M, —SO$_4$M, —SO$_3$R, —SO$_4$R, —COOM, —PO$_3$M$_2$ or —PO$_4$M$_2$ (M is H, NH$_4$ or an alkali metal, and R is an alkyl group having 1 to 12 carbons). Where there are two or more occurrences of M in the one molecule, each M may be the same or different.

The production method of the invention is carried out in the absence of a fluorine-containing compound of the formula (3) below:

$$X-(CF_2)_m-Y \tag{3}$$

where X is H or F; m is an integer of 6 or more; and Y is —SO$_3$M, —SO$_4$M, —SO$_3$R, —SO$_4$R, —COOM, —PO$_3$M$_2$ or —PO$_4$M$_2$, (M is H, NH$_4$ or an alkali metal, and R is an alkyl group having 1 to 12 carbons).

It is preferable for a surfactant to have a small number of carbons in the alkyl group because its removal from a polymer produced is easier. However, a surfactant having a small number of carbons has an insufficient surface activity, making PTFE polymerization difficult. The method of producing a low-molecular-weight PTFE according to the invention solves this problem by using the above-described fluorine-containing compound.

The above fluorine-containing compound has a surface activity comparable to that of a surfactant having seven or more carbons, such as a perfluorooctanoic acid salt, which has hitherto been used in emulsion polymerization, enabling emulsion polymerization to be carried out without difficulty. Even when the above fluorine-containing compound is used in a large quantity, its removal, recovery and reuse are easy, thus making it advantageous also from the standpoint of cost. A particle size control over a wide range is also possible.

The above fluorine-containing compound is preferably a fluorine-containing compound of the formula (2) below $$X-(CF_2)_n-COOM \tag{2}$$

(wherein X is H or F, n is an integer from 3 to 5, and M is H, NH$_4$ or an alkali metal), and is more preferably C$_5$F$_{11}$COONH$_4$.

The above fluorine-containing compound is preferably added in an amount which corresponds to from 100 to 10,000 ppm of an aqueous medium. If the fluorine-containing compound is added in an amount smaller than an amount corresponding to 100 ppm of an aqueous medium, the number of emulsified particles formed at the early stage of polymerization decrease, slowing the progress of the reaction, which may reduce the production efficiency or make it impossible to obtain an emulsion stabilizing effect. If the fluorine-containing compound is added in an amount greater than an amount corresponding to 10,000 ppm of an aqueous medium, a subsequent treatment step may be difficult to carry out.

The above low-molecular-weight PTFE is a TFE polymer having a number-average molecular weight of 600,000 or less. "High-molecular-weight PTFE" with a number-average molecular weight greater than 600,000 exhibits fibrillation properties distinctive to PTFE (see, for example, Japanese Patent Kokai Publication H10-147617). A high-molecular-weight PTFE has a high melt viscosity and is not melt-processable. Because a high-molecular-weight PTFE exhibits fibrillation properties when used as an additive, the PTFE particles readily agglomerate and thus have a poor dispersibility in a matrix material.

The low-molecular-weight PTFE is a TFE polymer having a melt viscosity at 380° C. of from 1×10$^2$ to 7×10$^5$ (Pa·s). If PTFE has a melt viscosity within this range, the number-average molecular weight will fall within the above-indicated range.

The above melt viscosity is the value measured in accordance with ASTM D 1238 by measuring a 2 g sample which has been pre-heated at 380° C. for 5 minutes, using a flow tester (Shimadzu Corporation) and a 2ϕ-8L die and holding, under a load of 0.7 MPa and at the above temperature. The each number-average molecular weight is a value calculated from the melt viscosity measured in the above manner.

The low-molecular-weight PTFE is preferably a TFE polymer having a melting point of from 324° C. to 333° C., The low-molecular-weight PTFE may be a tetrafluoroethylene homopolymer (TFE homopolymer), or a modified polytetrafluoroethylene (modified PTFE).

"TFE homopolymer" refers to a polymer obtained by polymerizing as a monomer only tetrafluoroethylene (TFE). "Modified PTFE" refers to a polymer obtained by copolymerizing TFE and a modifying monomer which is copolymerizable with TFE.

The modifying monomer in the modified PTFE is not subject to any particular limitation, provided it is capable of copolymerizing with TFE. Illustrative examples include perfluoroolefins such as hexafluoropropylene (HFP), chlorofluoroolefins such as chlorotrifluoroethylene (CTFE), hydrogen-containing fluoroolefins such as trifluoroethylene and vinylidene fluoride (VDF), perfluorovinyl ethers, perfluoroalkyl ethylenes and ethylene. The modifying monomer used may be of one species or may be of a plurality of species.

The perfluorovinyl ether is not subject to any particular limitation, and is exemplified by perfluoro unsaturated compound of the formula (I) below $$CF_2=CF-ORf \tag{I}$$

(wherein Rf is a perfluoro organic group). In the present description, "perfluoro organic group" refers to an organic group in which all the hydrogen atoms which bond to carbon atoms are substituted with fluorine atoms. The perfluoro organic group may have an ether oxygen.

Illustrative examples of a perfluorovinyl ether includes perfluoro(alkyl vinyl ethers) (PAVE) where, in the above formula (I), Rf represents a perfluoroalkyl group having 1 to 10 carbons. The number of carbons in the perfluoroalkyl group is preferably from 1 to 5.

Examples of the perfluoroalkyl group in the PAVE include perfluoromethyl, perfluoroethyl, perfluoropropyl, perfluorobutyl, perfluoropentyl and perfluorohexyl groups. Perfluoropropyl vinyl ether (PPVE), wherein the perfluoroalkyl group is perfluoropropyl group, is preferred.

Further examples of a perfluorovinyl ether include those where, in the above formula (I), Rf is a perfluoro (alkoxyalkyl) group having 4 to 9 carbons; those where Rf is a group of the following formula:

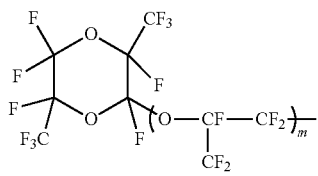
[Chem. 1]

(wherein m is 0 or an integer from 1 to 4); and those where Rf is a group of the following formula:

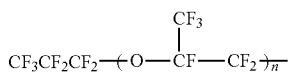
[Chem. 2]

(wherein n is an integer from 1 to 4).

Illustrative, non-limiting, examples of perfluoroalkyl ethylenes include perfluorobutyl ethylene (PFBE) and perfluorohexyl ethylene.

The modifying monomer in the modified PTFE is preferably HFP, CTFE, VDF, PPVE, PFBE or ethylene.

In the modified PTFE, the modifying monomer units are preferably 1% by mass or less, and more preferably from 0.001 to 1% by mass, of all the monomer units. In the present description, "modifying monomer units" refers to moieties which are a part of the molecular structure of the modified PTFE and are derived from the modifying monomer, and "all the monomer units" refers to all moieties within the molecular structure of the modified PTFE which are derived from the all monomers.

The method of producing the low-molecular-weight PTFE according to the present invention carries out, in an aqueous medium, emulsion polymerization in the presence of a chain transfer agent.

The aqueous medium is preferably deionized purified water of a high purity.

In the present invention, the chain transfer agent is preferably at least one compound selected from the group consisting of hydrogen, hydrocarbons having 1 to 3 carbons, and halogenated hydrocarbons having 1 to 3 carbons. Examples of the hydrocarbon having 1 to 3 carbons include methane, ethane and propane. Examples of the halogenated hydrocarbon having 1 to 3 carbons include chloromethane and chloroethane. The chain transfer agent is preferably ethane or propane.

A suitable range for the amount of the chain transfer agent added varies depending on the polymerization conditions, such as the species of the chain transfer agent, the reaction temperature, the polymerization pressure and the amount of a polymerization initiator added, and so cannot be strictly specified, although an amount in a range of from 0.1 to 20 mol % of the TFE present in the reaction system is preferred. At an amount of addition below 0.1 mol % based on the TFE present in the reaction system, an emulsified particle of the low-molecular-weight PTFE is not obtained and the high-molecular-weight PTFE may form. On the other hand, at an amount of addition greater than 20 mol %, the melt viscosity at 380° C. may be less than 100 Pa·s, resulting in a high amount of a high-temperature volatile index, which is unsuitable for applications where a temperature in a step involving dispersion in a matrix exceeds 300° C. and may therefore limit applications.

The polymerization initiator used in the emulsion polymerization is generally a peroxide of a water-soluble inorganic compound or a water-soluble organic compound, for example, a persulfate such as ammonium persulfate or potassium persulfate, or disuccinic acid peroxide or diglutaric acid peroxide. These may be used singly or as combinations of two or more thereof. In a low-temperature polymerization, the use of a redox initiator is preferred. In addition, insofar as a dispersion stability is not adversely affected, either or both a water-insoluble organic peroxide and azo compound may be used alone or together with a peroxide of a water-soluble inorganic compound or a water-soluble organic compound. From the standpoint of handleability, cost and the like, ammonium persulfate is preferred.

The amount of the above polymerization initiator added may be selected as appropriate for a target low-molecular-weight PTFE melt viscosity, based on polymerization conditions such as the species of the initiator, the species and amount of the chain transfer agent used together, and the polymerization temperature and pressure.

In the above emulsion polymerization, a stabilizer may be added. A preferred stabilizer includes paraffin waxes (hydrocarbons having 16 or more carbons), fluorinated oils, fluorine-containing compounds and silicone oils. Of these, the paraffin wax is preferred. It is preferable for a melting point of the paraffin wax to be generally from 40° C. to 65° C. Carrying out the emulsion polymerization in the aqueous medium containing such a stabilizer hinders agglomeration between the emulsified particles formed in the polymerization system, enabling a more stable emulsified particle to be obtained.

To more stably emulsify the low-molecular-weight PTFE, the above paraffin wax is preferably included in an amount of from 0.1 to 12 parts by mass per 100 parts by mass of the aqueous medium. This content has a more preferred lower limit of 1 part by mass and a more preferred upper limit of 8 parts by mass per 100 parts by mass of the aqueous medium.

In the emulsion polymerization, polymerization conditions such as the polymerization temperature and polymerization pressure are not subject to any particular limitation, and may be suitably selected according to such factors as the amount of TFE used, the species and amount of the modifying monomer, and productivity. The polymerization temperature is preferably from 5° C. to 100° C., and more preferably from 50° C. to 90° C. The polymerization pressure is preferably from 0.1 to 3.0 MPa.

The emulsion polymerization may be carried out by a batchwise manner, a semi-batchwise manner or a continuous manner using a known polymerization method. In the above emulsion polymerization, the modifying monomer, fluorine-containing compound, chain transfer agent, polymerization initiator, stabilizer and the like may be continuously added and suitably supplemented during the polymerization reaction, in accordance with the yield and melt viscosity of a target low-molecular-weight PTFE. This emulsion polymerization is generally carried out for a period of from 0.5 to 30 hours.

The emulsion polymerization may be started by charging the aqueous medium, chain transfer agent and monomer, and optional additives such as a stabilizer, into a pressure reaction vessel equipped with a stirrer, adjusting the temperature and pressure, then adding the polymerization initiator. The emulsion polymerization may be carried out while feeding the monomer into the above-described aqueous medium. In this emulsion polymerization, in addition to TFE, the modifying monomer may also be added as the monomer as described above.

In the method of producing the low-molecular-weight PTFE according to the present invention, the emulsion polymerization is preferably carried out in the presence of a fluorine-containing compound and also a reactive compound having a functional group capable of reaction in radical polymerization and a hydrophilic group.

By carrying out the emulsion polymerization using both the fluorine-containing compound and a reactive compound, a stability of a resultant aqueous dispersion of the low-molecular-weight PTFE can be enhanced. In addition, because the number of low-molecular-weight PTFE emulsified particles that arise in the system can be increased, the reaction rate rises, enhancing a productivity and enabling the range within which the primary particle size of the emulsified particle is controlled to be expanded.

Using the fluorine-containing compound and a reactive compound together is especially preferred because the number of low-molecular-weight PTFE emulsified particles and the primary particles size thereof can be easily controlled by controlling a concentration of the reactive compound.

Because the fluorine-containing compound is expensive, from the standpoint of cost, it is preferable to reduce their amount of use. By using also the above reactive compound, the aqueous dispersion can be stably produced even when the amount of the fluorine-containing compound used is reduced, enabling the essential costs of the emulsion polymerization to be cut. Moreover, the above reactive compound, when employed together with the fluorine-containing compound, is able to achieve the intended effects even at a very small amount of use.

Because the above reactive compound has a high water solubility, even when an unreacted portion of the reactive compound remains in the aqueous dispersion, as with the above-described fluorine-containing compound, removal, recovery and reuse thereof are easy. Hence, the advantages of the present invention are not compromised by the concomitant use of the above fluorine-containing compound and the reactive compound.

The reactive compound is incorporated into the produced polymer in the course of the emulsion polymerization. However, because the concentration of the reactive compound in the polymerization system is low, an amount of this compound incorporated within the polymer will be small. Accordingly, problems such as a decrease in the heat resistance of the low-molecular-weight PTFE or post-bake discoloration do not arise.

The reactive compound has a functional group capable of reaction in radical polymerization and a hydrophilic group.

The hydrophilic group in the reactive compound is exemplified by —NH$_2$, —PO$_3$M, —OPO$_3$M, —SO$_3$M, —OSO$_3$M, and —COOM (in each formula, M is H, NH$_4$ or an alkali metal). Of the above, the hydrophilic group is preferably —SO$_3$M or —COOM.

Examples of the "functional group capable of reaction in radical polymerization" in the reactive compound include groups having an unsaturated bond, such as a vinyl group and an allyl group.

Because the reactive compound has a functional group which is capable of reaction in radical polymerization, when the compound is used in the above emulsion polymerization, it reacts with the fluoromonomer at the early state of the polymerization reaction, thereby forming highly stable particles which have hydrophilic groups from the reactive compound. For this reason, carrying out emulsion polymerization in the presence of the above reactive compound increases the number of emulsified particles.

The emulsion polymerization may be carried out in the presence of a single reactive compound or in the presence of two or more reactive compounds.

The reactive compound used in the emulsion polymerization may be a compound having an unsaturated bond.

Of the above reactive compounds, a compound of any of the formulas (1a) to (1e) below may be used as the compound having an unsaturated bond.

Perfluorovinylalkyl compounds of the formula

(wherein $n_1$ is an integer from 1 to 10; and $Y^1$ is —SO$_3$M$^1$ or —COOM$^1$, M$^1$ being H, NH$_4$ or an alkali metal).

In the above formula (1a), $n_1$ is preferably an integer of 5 or less, and more preferably an integer of 2 or less. To obtain a suitable water solubility and surface activity, $Y^1$ is preferably —COOM$^1$. To discourage residual presence of the reactive compound as an impurity and enhance the heat resistance of the molded body obtained, M$^1$ is preferably H or NH$_4$.

The perfluorovinylalkyl compound of the above formula (1a) is exemplified by CF$_2$=CF$_2$COOM$^1$ (wherein M$^1$ is defined as above).

Perfluorovinylalkyl compounds of the formula (1b) below

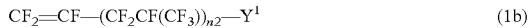

(wherein $n_2$ is an integer from 1 to 5, and $Y^1$ is as defined above).

In the above formula (1b), from the standpoint of emulsifiability, $n_2$ is preferably an integer of 3 or less. To obtain a suitable water solubility and surface activity, $Y^1$ is preferably —COOM$^1$. To discourage the residual presence of the reactive compound as an impurity and enhance the heat resistance of the molded body obtained, M$^1$ is preferably H or NH$_4$.

Perfluorovinyl ether compounds of the formula (1c) below

(wherein $X^1$ is F or CF$_3$, $n_3$ is an integer from 1 to 10, and $Y^1$ is as defined above).

In the above formula (1c), from the standpoint of water solubility, $n_3$ is preferably an integer of 5 or less. To obtain a suitable water solubility and surface activity, $Y^1$ is preferably —COOM$^1$. For a good dispersion stability, M$^1$ is preferably H or NH$_4$.

Perfluorovinyl ether compounds of the formula (1d) below

(wherein $n_4$ is an integer from 1 to 10, and $Y^1$ and $X^1$ are as defined above).

In the above formula (1d), from the standpoint of surface activity, $X^1$ is preferably —CF$_3$. From the standpoint of water solubility, $n_4$ is preferably an integer of 5 or less. To obtain a suitable water solubility and surface activity, $Y^1$ is preferably —COOM$^1$ and M$^1$ is preferably H or NH$_4$.

The perfluorovinyl ether compound of the above formula (1d) is exemplified by CF$_2$=CFOCF$_2$CF(CF$_3$)OCF$_2$CF$_2$COOM$^1$ (wherein M$^1$ is H, NH$_4$ or an alkali metal).

A fluoroallyl ether compound of the formula (1e) below

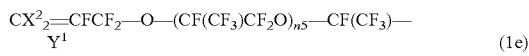
(1e)

(wherein each $X^2$ is the same and represents F or H, $n^5$ is 0 or an integer from 1 to 10, and $Y^1$ is as defined above).

In the above formula (1e), from the standpoint of emulsifiability, $n_5$ is preferably 0 or an integer from 1 to 5, more preferably 0, 1 or 2, and even more preferably 0 or 1. To obtain a suitable water solubility and surface activity, $Y^1$ is preferably —$COOM^1$. To discourage a residual presence of the reactive compound as an impurity and enhance a heat resistance of the molded body obtained, $M^1$ is preferably H or $NH_4$.

The fluoroallyl ether compound of the above formula (1e) is exemplified by $CH_2$=$CFCF_2OCF(CF_3)CF_2OCF(CF_3)COOM^1$ (wherein $M^1$ is as defined above).

The emulsified polymerization is preferably carried out in the presence of the reactive compound(s) in an amount which corresponds to from 100 ppb to 200 ppm of the aqueous medium. When the reactive compound or compounds are present in less than an amount that corresponds to 100 ppb of the aqueous medium, effects such as increasing the number of emulsified particles are difficult to achieve. On the other hand, when the reactive compound or compounds are present in more than an amount that corresponds to 200 ppm of the aqueous medium, a heat resistance and other properties of the low-molecular-weight PTFE obtained may decrease.

A more preferable lower limit in the amount of the reactive compound(s) is an amount which corresponds to 500 ppb of the aqueous medium, and a more preferable upper limit is an amount which corresponds to 20 ppm of the aqueous medium, and a still more preferable upper limit is an amount which corresponds to 10 ppm of the aqueous medium.

In the production method of the invention, an aqueous dispersion (latex) of the low-molecular-weight PTFE can be obtained by carrying out the above-described emulsion polymerization. The aqueous dispersion is generally obtained by dispersing emulsified particles of the low-molecular-weight PTFE up to 1 μm in size in an aqueous medium.

From the standpoint of a dispersion stability, the emulsified particle has an average primary particle size of preferably from 100 to 350 nm, and more preferably from 100 to 300 nm.

Because the production method of the invention carries out the emulsion polymerization in the presence of the above reactive compound, adjusting the average primary particle size of the emulsified particle to a relatively small particle size of from 100 to 220 nm is easy. In the production method of the invention, to enable the average primary particle size of the emulsified particle to be easily regulated within a range of 100 to 350 nm and to make it possible to obtain the low-molecular-weight PTFE emulsified particle having a desired primary particle size, it is preferable to use the above fluorine-containing compound and the above reactive compound together. Accordingly, in light of the above, the amount of the above reactive compound used in the emulsion polymerization is preferably set within the above-indicated range.

In this description, "average primary particle size" refers to an average particle size of an emulsified particle of the low-molecular-weight PTFE in an aqueous dispersion that has not been subjected to treatment such as concentration, dilution or purification following the end of polymerization, i.e., virgin aqueous dispersion.

The above average primary particle size is obtained as follows. A working curve of a transmittance of 550 nm incident light through a unit length of an aqueous dispersion adjusted to a low-molecular-weight PTFE concentration of 0.22% by mass versus an average primary particle size determined by measuring the particle diameter in a certain specific direction on a transmission electron micrograph is constructed. The above transmittance through a sample aqueous dispersion is then measured, and the average primary particle size is determined based on the working curve.

The solid content concentration of the low-molecular-weight PTFE in the aqueous dispersion obtained by carrying out the above-described emulsion polymerization may be set to a value of, on the completion of polymerization, generally from 7% to 35% by mass. From the standpoint of productivity, the solid content concentration has a lower limit of preferably 10% by mass, and more preferably 15% by mass, and a more preferred upper limit of 30% by mass. At a solid content concentration in excess of 35% by mass, the stability of the aqueous dispersion is lost, agglomeration between primary particles increases, and deposition on the inside of a reaction vessel increases, all of which tends to lower productivity.

In this description, the solid content concentration of the low-molecular-weight PTFE is determined as the ratio of the mass of the heated residue obtained by drying the target of measurement at 150° C. for 3 hours (Z g) to the mass of the measurement target (X g).

The production method according to the present invention, provided it includes the above emulsion polymerization step, may also include post-treatment steps such as concentration, dilution and purification following the emulsion polymerization, and may also include a step in which coagulation or the like is carried out to render the product into a powder. Operations and conditions in such post-treatment steps and such a powder formation step are not subject to any particular limitation, and may be carried out by methods known in the art.

The low-molecular-weight PTFE, which is obtained by the above-described production method of the invention, is also an aspect of the present invention. The low-molecular-weight PTFE of the invention may be in the form of either an aqueous dispersion or a powder (micropowder).

The low-molecular-weight PTFE of the invention has a melt viscosity at 380° C. of not more than $7 \times 10^5$ Pa·s. The melt viscosity is preferably not more than $5 \times 10^4$ Pa·s.

The aqueous dispersion of the low-molecular-weight PTFE according to the present invention may be an aqueous dispersion obtained directly by the above-described emulsion polymerization, or may be obtained by a post-treatment such as concentration, dilution or purification of the above aqueous dispersion. Such a post-treatment may be carried out by a method known in the art and is not subject to any particular limitation.

The aqueous dispersion of the low-molecular-weight PTFE of the invention may be concentrated by a known concentration process such as phase separation concentration (cloud point concentration), electroconcentration and ultrafiltration. The preferred solid content concentration following concentration is from 20% to 80% by mass. The stability of the aqueous dispersion is sometimes lost with concentration, although an additional dispersion stabilizer may be added in such cases. Illustrative, non-limiting, examples of the dispersion stabilizer include a nonionic surfactant such as a polyoxyalkyl ether, especially polyoxyethylene alkyl phenyl ethers (e.g., Triton X-100 (trade name), available from Rohm & Haas Co.), polyoxyethylene isotridecyl ethers (e.g., Noigen TDS80C (trade name), available from Dai-ichi Kogyo Seiyaku Co., Ltd.; Leocol TD90D (trade name) available from Lion Corporation; and Genapol X080 (trade name), available from Clariant), and polyoxyethylene ethers.

The total amount of the dispersion stabilizer is preferably a concentration of from 0.5% to 20% by mass, based on the solid content of the aqueous dispersion of the low-molecular-weight PTFE. At less than 0.5% by mass, the dispersion stability may be poor. On the other hand, an amount of more than 20% by mass is impractical because a dispersion effect in keeping with the amount of stabilizer present are not obtained. The lower limit of the above dispersion stabilizer is preferably 2% by mass, and the upper limit is preferably 12% by mass.

The amount of the fluorine-containing compound may be reduced by purifying using a known purification process, such as a process involving contact with an anion exchange resin, a phase separation concentration process, electroconcentration, or ultrafiltration to purify the aqueous dispersion of the low-molecular-weight PTFE according to the present invention. The aqueous dispersion of the low-molecular-weight PTFE according to the present invention may be a dispersion obtained by further concentrating a purified aqueous dispersion of the low-molecular-weight PTFE.

The aqueous dispersion of the low-molecular-weight PTFE according to the present invention may be set to a fluorine-containing compound concentration of 50 ppm or less of the aqueous dispersion by purification. The fluorine-containing compound concentration is more preferably set to 10 ppm or less, and more preferably to 1 ppm or less. It is especially preferable for the aqueous dispersion of the low-molecular-weight PTFE according to the present invention to include no fluorine-containing compound.

The aqueous dispersion of the low-molecular-weight PTFE which is subjected to a post-treatment such as concentration or purification may be an aqueous dispersion obtained by using both the above-described fluorine-containing compound and the above-described reactive compound.

For handleability and other reasons, it is preferable for the above aqueous dispersion of a low-molecular-weight PTFE to have a low-molecular-weight PTFE solid content concentration of from 20 to 80% by mass. An aqueous dispersion with the solid content concentration in the above range can be obtained by carrying out concentration after the above-described emulsion polymerization has been carried out.

The low-molecular-weight PTFE powder of the invention may be obtained by coagulating the above aqueous dispersion. That is, because the material for preparing the above powder is an aqueous dispersion obtained by the emulsion polymerization, it is possible to obtain the powder without carrying out post-treatment such as grinding, in addition to which the apparent density and average particle size can be controlled.

From the standpoint of handleability, the above low-molecular-weight PTFE powder has an average particle size of preferably from 1 to 30 μm, and more preferably from 2 to 20 μm. At an average particle size of less than 1 μm, the apparent density is too small, as a result of which the particles tend to swirl up, resulting in a poor handleability. On the other hand, at an average particle size greater than 30 μm, the particles do not readily disperse finely in the matrix material, and masses of the low-molecular-weight PTFE tend to form in the matrix material.

The above average particle size is equivalent to the particle size corresponding to 50% of the cumulative particle size distribution obtained by using a laser diffraction-type particle size distribution analyzer (Japan Laser Corporation) to measure the particle size distribution at a pressure of 0.1 MPa for a measurement time of 3 seconds without the use of a cascade.

The low-molecular-weight PTFE powder obtained by emulsion polymerization is prepared by coagulation of an emulsified particles, and thus has a specific surface area which is larger than that of the low-molecular-weight PTFE powder directly obtained by suspension polymerization, generally being from 6 to 15 $m^2/g$. At a large specific surface area, the particle is soft, enabling a high surface modifying effect, such as improvement in the coat-surface texture, to be achieved. In addition, an oil adsorption increases, enabling a stable dispersion in a matrix material to be achieved. At a specific surface area of less than 6 $m^2/g$, micro dispersion in the matrix material may be poor. The above low-molecular-weight PTFE powder has a specific surface area of preferably from 8 to 15 $m^2/g$.

In the present description, the specific surface area is measured by the BET method with a surface analyzer (available from QUANTA CHLROME under the trade name MONOSORB). A mixed gas (30% nitrogen, 70% helium) was used as a carrier gas, and liquid nitrogen was used for cooling.

A method for coagulating the above aqueous dispersion of the low-molecular-weight PTFE is generally one in which the emulsified particles are coagulated by a mechanical shearing force. However, to reduce the amount of a polymer remaining in the aqueous phase following coagulation, it is desirable to add an electrolyte such as nitric acid, sulfuric acid or ammonium nitrate as a coagulant to the aqueous dispersion prior to coagulation. When an acid is used as the electrolyte, it is preferable to neutralize the aqueous phase and coagulated particles following coagulation with an alkali such as sodium hydroxide or potassium hydroxide.

Subsequently, to remove the fluorine-containing compound, the coagulated particles are generally freshly washed with purified water. To increase a removal efficiency, it is preferable to repeat washing a plurality of times.

The low-molecular-weight PTFE of the invention may be suitably used as an additive in modifying a molding material, an ink, a cosmetic, a grease, an office automation equipment component, and a toner. The molding material is exemplified by an engineering plastic such as a polyoxybenzoyl polyester, a polyimide, a polyamide, a polylamideimide, a polyacetal, a polycarbonate and a polyphenylene sulfide.

The low-molecular-weight PTFE of the invention may be suitably used as an additive in a molding material, examples of which include applications for enhancing a nonstickiness and a sliding property of a copy roller or for improving the texture of a molded article made of an engineering plastic, such as surface layer sheets for furniture, automotive dashboards, and electric appliance covers; applications for improving lubricity and an abrasion resistance of mechanical components which generate mechanical friction, such as light load bearings, gears, cams, telephone buttons, movie projectors, camera components, and sliding members; and processing additives for engineering plastics.

The low-molecular-weight PTFE of the invention may be used as a coating additive for the purpose of enhancing the lubricity of varnish or paint. The low-molecular-weight PTFE of the invention may also be used as an additive in cosmetics, such as to enhance the lubricity of a foundation and other cosmetics.

The low-molecular-weight PTFE of the invention is also suitable for applications that enhance an oil repellency or water repellency of waxes and the like, and applications which enhance the lubricity of greases and toners. A molding material (e.g., an engineering plastic), a paint, a cosmetic, a grease and a toner which contains such low-molecular-weight PTFE are additional aspects of the present invention.

Effects of the Invention

The aqueous dispersion of the low-molecular-weight PTFE according to the present invention has a good dispersion stability and, even when used as an additive, does not have an adverse effect that typically arise from a surfactant. Moreover, when used as an additive, it is able to improve a coat-surface texture and can finely disperse in a matrix material with ease.

Because the low-molecular-weight PTFE powder of the invention contains no surfactant which is not easy to remove, when used directly as an additive, there are no adverse effects of the sort that typically arise from a surfactant.

The method of producing the low-molecular-weight PTFE according to the present invention uses a surfactant that is easy to remove, and is able to produce the low-molecular-weight PTFE which is suitable as an additive that improves lubricity and the coat-surface texture.

BEST MODES FOR CARRYING OUT THE INVENTION

The present invention is described more fully below by way of examples, although the invention is not limited by these examples. In each working example of the invention and comparative example, unless noted otherwise, "parts" and "%" refer respectively to parts by mass and percent by mass.

Comparative Example 1

A stainless steel autoclave having an internal capacity of 6 liters and equipped with a stainless steel anchor-shaped agitation blade and a jacket for temperature regulation was charged with 3.3 L of deionized water and 5.0 g of ammonium perfluorooctanoate (APFO) as the fluorine-containing surfactant, then tightly closed. Oxygen within the system was removed by repeatedly introducing nitrogen gas under pressure and degassing the system a plurality of times, after which 70 mg of propane as a chain transfer agent was introduced under pressure with tetrafluoroethylene (TFE) and the pressure within the reactor was set to 0.10 MPa. The temperature within the reactor was raised under stirring at 500 rpm. Once the temperature within the reactor had reached 55° C., TFE was again introduced under pressure, and the pressure within the reactor was adjusted to 0.75 MPa.

An aqueous solution prepared by dissolving 850 mg of ammonium persulfate (APS) as a polymerization initiator in 20 mL of deionized water was introduced under pressure with TFE into the reactor, and the pressure within the reactor was set to 0.80 MPa. Because the pressure within the reactor falls owing to decomposition of the polymerization initiator, TFE is continuously fed into the reactor so as to maintain the pressure within the reactor at 0.80±0.05 MPa. Throughout the reaction, the temperature within the reactor was regulated at 55±1°, and a stirring rate was controlled to 500 rpm. When TFE consumption reached 850 g, stirring was stopped and the pressure within the reactor was released to ordinary pressure, after which the gas phase was substituted with nitrogen, thereby giving an aqueous dispersion of the low-molecular-weight PTFE.

Twenty grams of nitric acid was added to 3,000 g of the above aqueous dispersion of the low-molecular-weight PTFE, coagulation was induced by applying a strong mechanical shear force, and then 20 g of a 24% by mass aqueous solution of sodium hydroxide was added. The wet powder thus obtained was filtered, and then freshly washed with 1,800 g of purified water. This washing operation was repeated three times, following which 18 hours of drying was carried out in a 160° C. hot-air circulation oven, thereby giving a low-molecular-weight PTFE powder.

Example 1

Aside from charging 5.0 g of ammonium perfluorohexanoate (APFH) in place of APFO into the system, an aqueous dispersion of a low-molecular-weight PTFE was obtained in the same way as in Comparative Example 1. Coagulation, washing and drying steps were carried out on the above aqueous dispersion in the same way as in Comparative Example 1, thereby giving a target low-molecular-weight PTFE powder.

TDS-80C (Dai-ichi Kogyo Seiyaku Co., Ltd.) was added as a nonionic surfactant to the above aqueous dispersion in an amount of 6.0% by mass, based on the mass of the polymer included, and the pH was adjusted to 9.0 with ammonia water, following which the dispersion was concentrated to a PTFE solid content of 60% by mass by being held at ordinary pressure and 65° C. so as to cause water to evaporate off. The average particle size of the PTEF primary particles in the concentrated aqueous dispersion is the same as that in the pre-concentration aqueous dispersion.

Example 2

Aside from changing the amount of APFH charged to 10.0 g, an aqueous dispersion of a low-molecular-weight PTFE was obtained in the same way as in Example 1. The same coagulation, washing and drying steps were carried out on the aqueous dispersion as in Example 1, thereby giving the target low-molecular-weight PTFE powder.

Example 3

Aside from changing the polymerization temperature to 85° C., and the amount of propane charged to 35 mg, an aqueous dispersion of a low-molecular-weight PTFE was obtained in the same way as in Example 1. The same coagulation, washing and drying steps were carried out on the aqueous dispersion as in Example 1, thereby giving the target low-molecular-weight PTFE powder.

Example 4

Aside from charging 66 mg of a 50% aqueous solution of $CH_2=CFCF_2OCF(CF_3)CF_2OCF(CF_3)COONH_4$ (reactive compound A) into the system, an aqueous dispersion of a low-molecular-weight PTFE was obtained in the same way as in Example 1. Coagulation, washing and drying steps were carried out on the above aqueous dispersion in the same way as in Example 1, thereby giving the target low-molecular-weight PTFE powder.

TDS-80C (Dai-ichi Kogyo Seiyaku Co., Ltd.) was added as a nonionic surfactant to the above aqueous dispersion in an amount of 6.0% by mass, based on the mass of the polymer included, and the pH was adjusted to 9.0 with ammonia water, following which the system was concentrated to a PTFE solid content of 60% by mass by being held at ordinary pressure and 65° C. so as to cause water to evaporate off. The average particle size of PTEF primary particles in the concentrated aqueous dispersion is the same as that in the pre-concentration aqueous dispersion.

Example 5

Aside from changing the amount of the 50% aqueous solution of the reactive compound A charged to 33 mg, an aqueous dispersion of a low-molecular-weight PTFE was obtained in the same way as in Example 4. The same coagulation, washing and drying steps were carried out on the aqueous dispersion as in Example 4, thereby giving a target low-molecular-weight PTFE powder.

Example 6

Aside from changing the amount of the 50% aqueous solution of the reactive compound A charged to 6.6 mg, an aqueous dispersion of a low-molecular-weight PTFE was obtained in the same way as in Example 4. The same coagulation, washing and drying steps were carried out on the aqueous dispersion as in Example 4, thereby giving a target low-molecular-weight PTFE powder.

Example 7

Aside from changing the amount of APFH charged to 1.7 g, an aqueous dispersion of a low-molecular-weight PTFE was obtained in the same way as in Example 5. The same coagulation, washing and drying steps were carried out on the aqueous dispersion as in Example 4, thereby giving a target low-molecular-weight PTFE powder.

Physical properties (1) and (2) below were measured for the aqueous dispersions of the low-molecular-weight PTFE obtained in each of the Examples and in Comparative Example 1, and physical properties (3) to (8) below were measured for the powders obtained in the respective Examples and comparative examples.

(1) Solid Content Concentration in Aqueous Dispersion (P %)

The solid content concentration in each aqueous dispersion (P %) was determined, based on the mass of an ignition residue (Z g) obtained by heating the aqueous dispersion (X g) for 3 hours at 150° C., using the formula: P=Z/X×100(%).

(2) Average Primary Particle Size

A working curve of the transmittance of 550 nm incident light through a unit length of an aqueous dispersion adjusted to a low-molecular-weight PTFE concentration of 0.22% by mass versus an average primary particle size determined by measuring the particle diameter in a certain specific direction on a transmission electron micrograph was constructed. The above transmittance through the aqueous dispersion being assayed was then measured, and the average primary particle size was determined based on the working curve.

(3) Apparent Density

Measured in accordance with JIS K-6891.

(4) Average Particle Size

The above average particle size was equivalent to the particle size corresponding to 50% of the cumulative particle size distribution obtained by using a laser diffraction-type particle size distribution analyzer (JEOL Ltd.) to measure the particle size distribution at a pressure of 0.1 MPa for a measurement time of 3 seconds without the use of a cascade.

(5) Melt Viscosity

The melt viscosity was measured in accordance with ASTM D-1238 by using a Flow Tester (Shimadzu Corporation) and a 2ϕ-8L die and holding, under a load of 0.7 MPa and at a measurement temperature (380° C.), a 2 g sample which was pre-heated at the above temperature for 5 minutes.

(6) Melting Point

Using a differential scanning calorimeter RDC 220 (DSC) manufactured by SII Nanotechnology Inc., temperature calibration was carried out beforehand using indium and lead as standard samples. Next, about 3 mg of the low-molecular-weight PTFE powder being assayed was placed in an aluminum pan (crimped container), the temperature was raised at a rate of 10° C./min from 250° C. to 380° C. under a stream of air having a flow rate of 200 mL/min, and the heat of fusion minimum in the above range was taken as the melting point.

(7) Specific Surface Area

The specific surface area was measured by BET method with a surface analyzer (available from QUANTA CHLROME under the trade name MONQSORB). A mixed gas (30% nitrogen, 70% helium) was used as the carrier gas, and liquid nitrogen was used for cooling.

(8) Fluorine-Containing Compound Concentration in Powder

A methanol solution of a fluorine-containing compound having a known concentration was measured using a Quattro micro API (Waters Corporation) under the following conditions: column, Atlantis dC18 (Waters Corporation); developing solution, acetonitrile/0.15% aqueous acetic acid=45/55 (vol/vol %); flow rate, 0.15 mL/min; sample volume, 5 μL; column temperature, 40° C.; monitored mass, m/z=313>269 or m/z=413>369. A working curve was constructed from the concentration of the fluorine-containing compound versus the surface area of the fluorine-containing compound peak.

Thirty milliliters of methanol was added as an extracting solvent to 3 g of the powder being assayed, and extraction was carried out at 150° C. for 60 minutes using Microwave Assisted Solvent Extraction MARS5 (CEM Corporation). The methanol solution following extraction was measured under the above measurement conditions, and the fluorine-containing compound concentration in the powder was determined, based on the above working curve, from the resulting fluorine-containing compound peak area. The lower limit of detection for the fluorine-containing compound concentration in the above powder was 0.01 ppm.

The above results are shown in Table 1.

TABLE 1

|  | Comp. Ex. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Fluorine-containig compound/charged amount (g) | APFO/5.0 | APFH/5.0 | APFH/10.0 | APFH/5.0 | APFH/5.0 | APFH/5.0 | APFH/5.0 | APFH/1.7 |

TABLE 1-continued

|  | Comp. Ex. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Charged amount of reactive compound A (ppm) | — | — | — | — | 10 | 5 | 1 | 5 |
| Reaction time (h) | 3.5 | 4.5 | 4.0 | 1.5 | 3.6 | 3.7 | 4.3 | 4.2 |
| Solid content concentration (% by mass) | 20.4 | 20.0 | 20.4 | 20.4 | 20.5 | 20.4 | 20.3 | 20.0 |
| Average primary particle size (nm) | 180 | 220 | 190 | 190 | 130 | 180 | 210 | 180 |
| Apparent density (g/cc) | 0.36 | 0.34 | 0.36 | 0.36 | 0.35 | 0.35 | 0.35 | 0.35 |
| Average particle size (μm) | 5 | 4 | 5 | 5 | 5 | 5 | 5 | 5 |
| Melt viscosity (Pa · S) | 17000 | 15000 | 18000 | 7500 | 16000 | 16000 | 16000 | 14000 |
| Melting point (° C.) | 329 | 329 | 329 | 328 | 328 | 329 | 329 | 329 |
| Specific surface area (m$^2$/g) | 10.5 | 8.5 | 10.0 | 10.0 | 13.0 | 11.5 | 8.5 | 11.0 |
| Fluorine-containing compound concentration of powder (ppm) | 12.47 | 0.13 | 0.17 | 0.13 | 0.11 | 0.11 | 0.17 | 0.10 |

The above results show that, in each of Examples, the aqueous dispersion containing an emulsified particle of the low-molecular-weight PTFE was obtained in the same way as in Comparative Example 1.

INDUSTRIAL APPLICABILITY

The aqueous dispersions of the low-molecular-weight PTFE and the low-molecular-weight PTFE powder of the invention are well-suited for use as an additive for modifying a molding material, an ink, a cosmetic, a paint, a grease, an office automation equipment component and a toner. The production method of the invention may be employed in the production of a low-molecular-weight PTFE which is particularly suitable as an additive for improving lubricity and a coat-surface texture.

The invention claimed is:

1. A method of producing a low-molecular-weight polytetrafluoroethylene, comprising: emulsion-polymerizing, in an aqueous medium, tetrafluoroethylene, or tetrafluoroethylene and a modifying monomer copolymerizable with the tetrafluoroethylene in the presence of a chain transfer agent,
wherein the emulsion polymerization is carried out in the presence of a fluorine-containing compound of the formula (1) below:

X—(CF$_2$)$_m$—Y        (1)

where X is H or F; m is an integer from 3 to 5; and Y is —SO$_3$M, —SO$_4$M, —SO$_3$R, —SO$_4$R, —COOM, —PO$_3$M$_2$ or —PO$_4$M$_2$, M being H, NH$_4$ or an alkali metal, and R being an alkyl group having 1 to 12 carbons,
wherein the emulsion polymerization is further carried out in the presence of a reactive compound which has a functional group capable of reacting in radical polymerization and a hydrophilic group, and
wherein the reactive compound is used in an amount which corresponds to from 100 ppb to 20 ppm of the aqueous medium.

2. The method of producing a low-molecular-weight polytetrafluoroethylene according to claim 1, wherein the reactive compound has an unsaturated bond.

3. The method of producing a low-molecular-weight polytetrafluoroethylene according to claim 1,
wherein the reactive compound is a perfluorovinylalkyl compound of the formula (1a) below:

CF$_2$=CF—(CF$_2$)$_{n1}$—Y$^1$        (1a)

where n$_1$ is an integer from 1 to 10; and Y$^1$ is —SO$_3$M$^1$ or —COOM$^1$, M$^1$ being H, NH$_4$ or an alkali metal),
a perfluorovinylalkyl compound of the formula (1b) below:

CF$_2$=CF—(CF$_2$C(CF$_3$)F)$_{n2}$—Y$^1$        (1b)

where n$_2$ is an integer from 1 to 5; and Y$^1$ is as defined above,
a perfluorovinyl ether compound of the formula (1c) below:

CF$_2$=CF—O—(CFX$^1$)$_{n3}$—Y$^1$        (1c)

where X$^1$ is F or CF$_3$; n$_3$ is an integer from 1 to 10; and Y$^1$ is as defined above,
a perfluorovinyl ether compound of the formula (1d) below:

CF$_2$=CF—O—(CF$_2$CFX$^1$O)$_{n4}$—CF$_2$CF$_2$—Y$^1$        (1d)

where n$_4$ is an integer from 1 to 10; and Y$^1$ and X$^1$ are as defined above,
or a fluoroalkyl ether compound of the formula (1e) below:

CX$^2$$_2$=CFCF$_2$—O—(CF(CF$_3$)CF$_2$O)$_{n5}$—CF(CF$_3$)—Y$^1$        (1e)

where each X$^2$ is the same and represents F or H; n$_5$ is 0 or an integer from 1 to 10; and Y$^1$ is as defined above.

4. The method of producing a low-molecular-weight polytetrafluoroethylene according to claim 1,
wherein the reactive compound is used in an amount which corresponds to from 100 ppb to 10 ppm of the aqueous medium.

5. The method of producing a low-molecular-weight polytetrafluoroethylene according to claim 1,
wherein the fluorine-containing compound is used in an amount which corresponds to from 100 to 10,000 ppm of the aqueous medium.

6. The method of producing a low-molecular-weight polytetrafluoroethylene according to claim 1,
wherein the modifying monomer which is copolymerizable with tetrafluoroethylene is hexafluoropropylene, perfluoropropyl vinyl ether or vinylidene fluoride.

* * * * *

UNITED STATES PATENT AND TRADEMARK OFFICE
CERTIFICATE OF CORRECTION

PATENT NO.       : 10,047,175 B2
APPLICATION NO.  : 14/645775
DATED            : August 14, 2018
INVENTOR(S)      : Taku Yamanaka et al.

It is certified that error appears in the above-identified patent and that said Letters Patent is hereby corrected as shown below:

Column 20, Claim 3, Lines 42-43:
Delete "or a fluoroalkyl ether compound of the formula (1e) below:" and insert --or a fluoroallyl ether compound of the formula (1e) below:--

Signed and Sealed this
Second Day of October, 2018

Andrei Iancu
*Director of the United States Patent and Trademark Office*